UNITED STATES PATENT OFFICE.

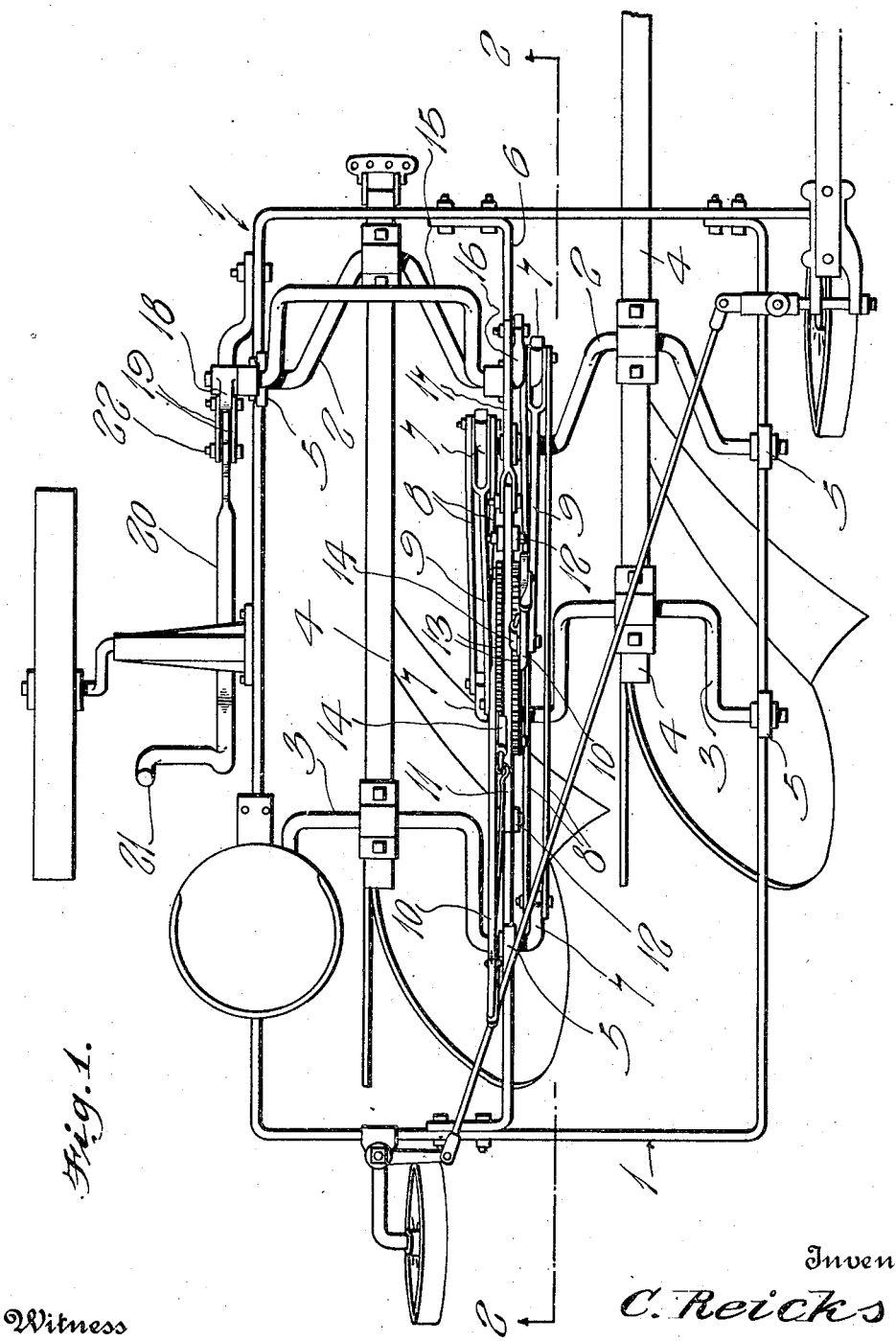

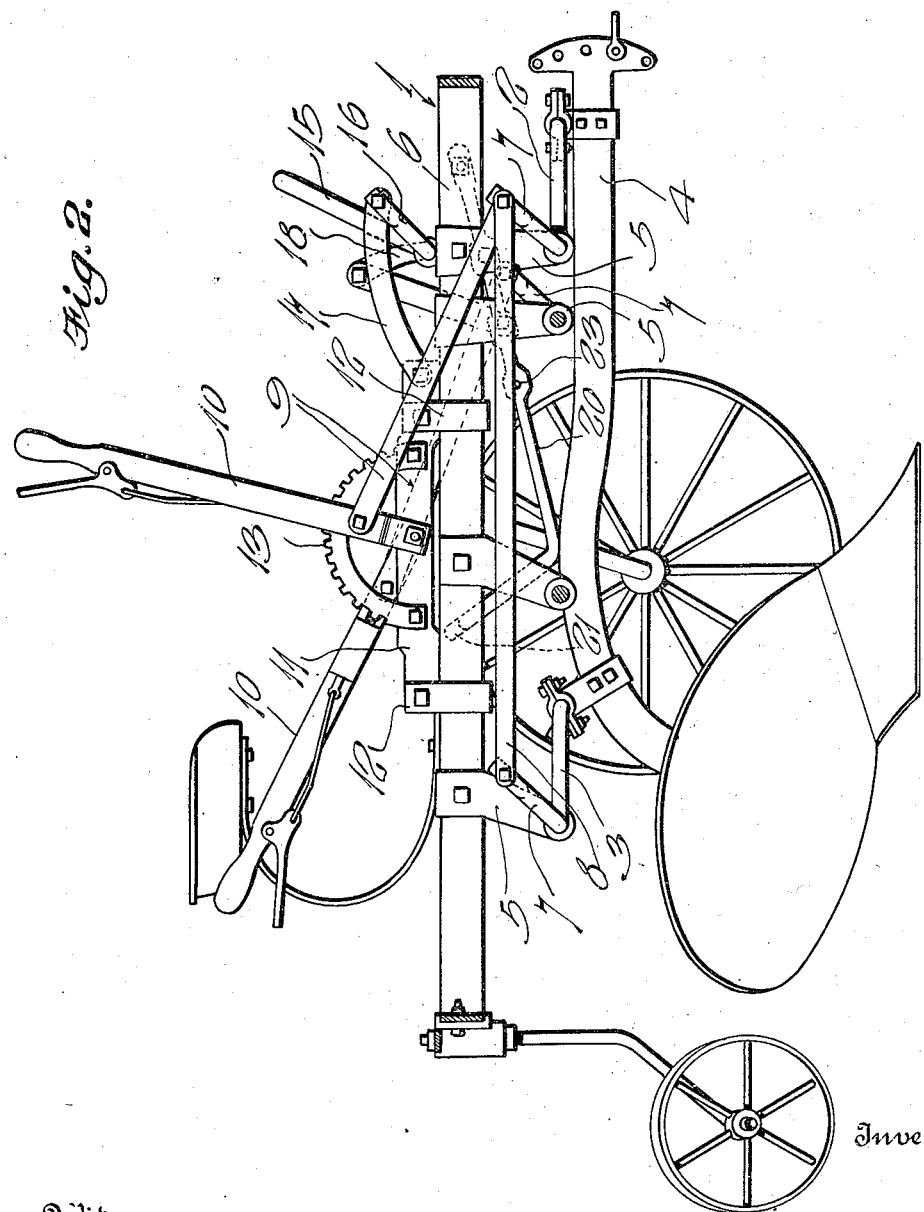

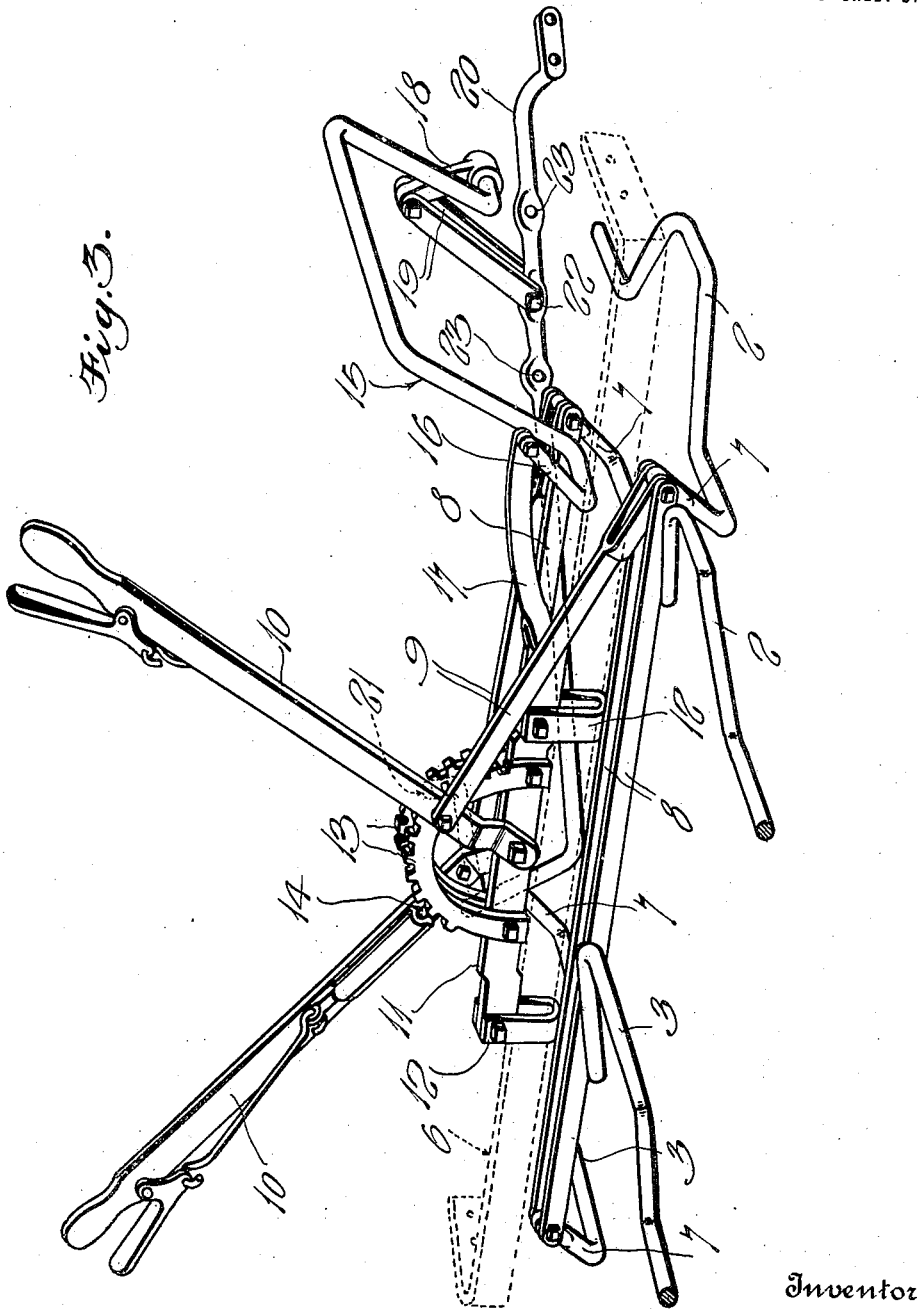

CLEMENT REICKS, OF AUBURN TOWNSHIP, FAYETTE COUNTY, IOWA.

GANG-PLOW.

1,250,013.  Specification of Letters Patent.  Patented Dec. 11, 1917.

Application filed March 22, 1917. Serial No. 156,636.

*To all whom it may concern:*

Be it known that I, CLEMENT REICKS, a citizen of the United States, residing at Auburn township, in the county of Fayette and State of Iowa, have invented certain new and useful Improvements in Gang-Plows; and I do declare the following to be a full, clear, and exact description of the invention, such as will enable others skilled in the art to which it appertains to make and use the same.

My invention which relates to improvements in gang or sulky plows, has for its principal object to provide simple and efficient means whereby any plow of the gang may be raised and lowered independently of any other and whereby all of said plows may be raised or lowered simultaneously when required.

With the foregoing general object in view, the invention resides in certain novel features of construction and unique combinations of parts to be hereinafter fully described and claimed, the descriptive matter being supplemented by the accompanying drawings which constitute a part of this application and in which:—

Figure 1 is a top plan view of a gang plow of the sulky type constructed in accordance with my invention;

Fig. 2 is a longitudinal section on the plane indicated by the line 2—2 of Fig. 1;

Fig. 3 is a perspective view of the plow adjusting means.

In the drawings above briefly described, the numeral 1 has reference to the usual frame of a sulky plow while the numerals 2 and 3 designate the front and rear cranks upon which the plow beams 4 are mounted, two front and two rear cranks being shown although any suitable number could well be employed. The inner ends of the cranks 2 and 3 are supported by suitable bearings 5 depending from a substantially central longitudinal bar 6 constituting a part of the frame 1, said ends of the cranks having laterally extending arms 7 connected by links 8 so that the front and rear crank of each plow will move in unison.

Longitudinally extending links 9 are pivoted to the arms 7 of the front cranks 2 and at their rear ends are connected to levers 10 whereby either plow may be adjusted vertically by movement of the proper lever. The two levers 10 are fulcrumed at their lower ends to a carriage 11 preferably in the form of a metal bar standing on edge upon the bar 6 and guided in its movement by U-shaped clips 12 as shown most clearly in Figs. 2 and 3. Segmental racks 13 are secured to the carriage 11 and the levers 10 are provided with dogs 14 coöperating with said racks to hold said levers in adjusted position. Under normal circumstances, that is, when the plow is operating, the slide or carriage 11 is at the forward limit of its movement but it is intended that said carriage shall be moved rearwardly so that both links 9 are simultaneously operated to rock their respective shafts to simultaneously raise the two plows.

Any suitable means may be provided for moving the carriage 11 in the last named manner but preferably employed for this purpose is an arched transverse rock shaft 15 having a crank arm 16 connected with the front end of said carriage by one or more links 17. The end of the shaft 15 remote from the arm 16 is provided with a similar arm 18 connected by links 19 with a longitudinally extending foot lever 20 having a foot pedal 21 on its rear end. The links 19 are preferably connected adjustably with the lever 20 by means of a bolt 22 which may be passed through any of a series of openings 23 as illustrated in Fig. 3. It will thus be seen that depression of the lever 20 may be made to rock the shaft 15 a greater or less amount and that the movement imparted to the carriage 11 for raising and lowering the plow simultaneously may thus be varied.

From the foregoing, taken in connection with the accompanying drawings, it will be observed that although either plow may be adjusted independently of the other by operation of its respective lever 10, both plows may be simultaneously raised from the earth by depressing the foot pedal 21 and again lowered by releasing said pedal. Since these advantages are obtained best by the construction shown, this construction constitutes the preferred form of my invention. It is to be understood, however, that within the scope of the invention as claimed, numerous changes may be made without sacrificing the principal advantages.

I claim:

1. The combination with a portable frame and a plurality of earth-working implements, of independent raising means for each of said implements, said means including a plurality of manual controls, a carriage in the form of a longitudinally extending bar resting on edge on a longitudinal bar of said frame, said carriage carrying said controls, clips passing slidably around said bar of the frame and secured to said carriage, and means for shifting said carriage.

2. The combination of a portable frame including a longitudinal bar, a plurality of implements, independent controls for raising said implements, a longitudinal carriage bar contacting slidably with said longitudinal bar of the frame, said controls being mounted on and movable in the same direction as said carriage bar, guiding means for said carriage bar and means for sliding said carriage bar forwardly and rearwardly.

3. The combination of a portable frame, a plurality of earth working implements, means for raising said implements independently of each other, said means including an independent manual control for each implement, all of said controls being movable in the same direction, a carriage upon which said controls are mounted, said carriage being slidable along said frame in the direction of movement of said controls, and means for sliding said carriage to simultaneously move all said controls for raising the implements in unison.

In testimony whereof I have hereunto set my hand in the presence of two subscribing witnesses.

CLEMENT REICKS.

Witnesses:
N. E. GOHEEN,
T. H. GOHEEN.

Copies of this patent may be obtained for five cents each, by addressing the "Commissioner of Patents, Washington, D. C."